United States Patent [19]

Bjorklund

[11] 4,354,519

[45] Oct. 19, 1982

[54] NON-DRIP VALVE APPARATUS

[76] Inventor: Curt A. Bjorklund, Box 99, Stenasgatan 14, S-523 00 Ulrichehamn, Sweden

[21] Appl. No.: 127,764

[22] Filed: Mar. 6, 1980

[30] Foreign Application Priority Data

Mar. 20, 1979 [SE] Sweden ............................... 7902479

[51] Int. Cl.[3] ............................................. F16K 23/00

[52] U.S. Cl. .................................... 137/312; 137/329; 137/881; 137/882; 431/121

[58] Field of Search ................ 431/119, 121; 137/881, 137/882, 329, 312; 239/124, 126, 120

[56] References Cited

U.S. PATENT DOCUMENTS 2,685,919 8/1954 Plass et al. ...................... 431/121 X 3,987,810 10/1976 Bjorklund ...................... 431/121 X 4,134,428 1/1979 Borklund .

*Primary Examiner*—Gerald A. Michalsky

*Attorney, Agent, or Firm*—Dann, Dorfman, Herrell and Skillman

[57] ABSTRACT

A no-drip valve apparatus for regulating a fluid flow from an inlet to an outlet. A pressure activated supply valve means controls the flow of fluid through the valve. A partition member cooperates with a vacuum chamber to retract and retain any remaining oil in the valve or the oulet nozzle when the pressure activated supply valve means cuts off the flow of oil through the valve. The partition member is resiliently displaced by pressure fluid from a supply chamber adjacent the inlet and is displaced in one direction prior to flow of fluid to the outlet and is displaced in the other direction upon termination of the flow of fluid through the outlet.

7 Claims, 16 Drawing Figures

NON-DRIP VALVE APPARATUS

FIELD OF THE INVENTION

The present invention relates generally to fluid valves and, more particularly, to a non-drip valve for liquids which is effective to limit post-drip of the liquid after the valve is closed.

DESCRIPTION OF THE PRIOR ART

The present invention is a further development of valves of the type depicted and described in my U.S. Pat. Nos. 4,172,471 issued Oct. 30, 1979 and 4,134,428 issued Jan. 16, 1979.

One problem with the existing valves, particularly the valves of the type used to control the flow of fuel oil to the nozzle of an oil burner, is that they tend to close off the flow of oil slowly. The slow closure of these valves results in small quantities of oil remaining in the nozzle to drip out resulting in a build-up of soot in the oil furnace.

Several prior art valves have been relatively successful in preventing the post-drip of oil from the nozzle; however, they suffer from other drawbacks. One prior art valve requires substantial pressure differentials to power the operation of the device, thereby requiring additional increases in pump pressure to retract or draw back the post-drip oil thereby decreasing the service life of the pump and creating problems in maintaining the necessary pressure level in the device.

Yet another prior art valve includes a one-way bypass valve in the main flow line to return the post-drip oil. The one-way bypass valve can result in problems caused by impurities or air bubbles within the oil making it inoperative.

It is therefore an object of the present invention to provide a non-drip valve which does not require additional increases in pump pressure.

It is another object of the present invention to provide such a valve which does not include additional valving structure which may be rendered inoperative by impurities or air bubbles within the oil.

It is a further object of the present invention to provide such a valve which is relatively simple and inexpensive to produce.

It is yet another object of the present invention to provide such a valve which can easily be adapted to be built into an existing pump.

SUMMARY OF THE INVENTION

These objects as well as additional objects and advantages which will become apparent from the following detailed description and the appended drawings and claims are accomplished by the present invention which, in one form, provides a non-drip valve apparatus for regulating a fluid flow from an inlet to an outlet. The valve comprises a housing having an inlet, a supply chamber, a vacuum chamber and an outlet, the supply chamber being in fluid communication with the inlet. A first conduit extends between the supply chamber and the outlet and a pressure activated supply valve means at the supply chamber end of the first conduit operates to open and close the first conduit in response to fluid pressure in the supply chamber being above or below a first predetermined pressure level. A partition member is positioned in the vacuum chamber to divide the vacuum chamber into at least two subchambers. A second conduit extends between the outlet and a first of the subchambers. A third conduit extends between the supply chamber and a second subchamber on the opposite side of the partition member from the first subchamber. The partition member operates to reduce and expand the volume of the first subchamber in response to fluid pressure in the second subchamber being above or below the pressure level in the first subchamber.

This arrangement provides a rapidly-operating positive action at stop to insure the elimination of unburned oil in the furnace at start and at start to insure the prompt feed of oil to the nozzle. Specifically, the pressure level necessary to operate the device is built up before the device achieves its pre-set operating level.

BRIEF DESCRIPTION OF THE DRAWINGS

The foregoing summary as well as the following detailed description of a preferred and nine alternate embodiments of the present invention will be better understood when read in conjunction with the accompanying drawings, in which.

DESCRIPTION OF A PREFERRED EMBODIMENT

Figure 1:
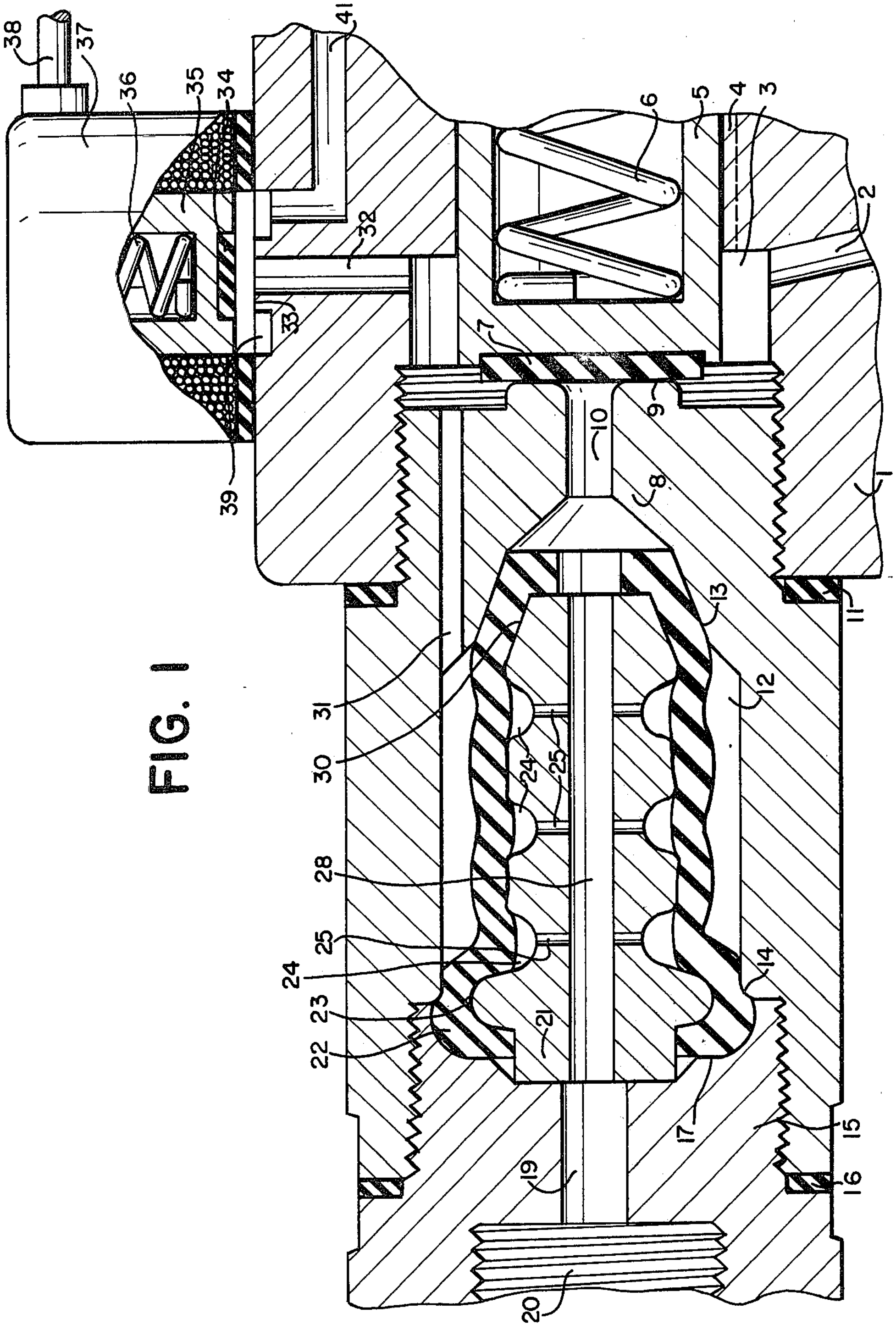
FIG. 1 is a sectional view of a preferred embodiment of the present invention in the rest position.

Referring to the drawings and particularly to FIG. 1, there is provided in accordance with the present invention a valve in the rest or pre-blowing position, comprising a housing 1 with an inlet channel 2. The inlet channel 2 communicates with a supply chamber 3 which includes a pressure regulating channel 4 (shown in phantom) extending therefrom. For purposes which will hereinafter become apparent, the other end of the pressure regulating channel 4 is in communication with a return passage of a pump (not shown). It should be understood, however, that the use of a pressure regulating channel 4 is not intended as a limitation upon the present invention. In some applications, the invention may be employed in a valve housing without a pressure regulating channel 4.

A pressure piston 5, under the urging of a helical compression spring 6, extends into the supply chamber 3. For purposes which will hereinafter become apparent, the compression of the piston spring 6 is preset so that the piston 5 will be displaced to the right (viewing FIG. 1) when the pressure within the supply chamber 3 reaches a specific level, for example, 7 Kg/cm$^2$. The end of the piston 5 contains a sealing disc 7 comprised of a suitable sealing material, for example, neoprene. The sealing disc 7 is axially aligned with a seat 9 which is formed on the end of a connection piece 8 extending into the supply chamber 3. It should be understood, however, that the use of a spring operated pressure piston is not indispensable to the present invention. As an alternative, for example, an electromagnetic valve operating in conjunction with the pump and which may or may not be activated in response to the pressure in the supply chamber 3 may control the flow through the seat 9. The connection piece 8 may include a threaded portion which may be screwed into suitable threads within the housing 1 or attachment to the housing 1 may be accomplished in any other suitable manner. A resilient circlet or seal ring 11 is provided for sealing the joint between the connection piece 8 and the housing 1.

A feed conduit 10 which preferably penetrates centrally and axially through the connection piece 8 provides a communication between the supply chamber 3 and a preferably circular pressure chamber 12 located within the interior of the connection piece 8. As shown on FIG. 1, in the rest or pre-blowing position of the valve, the compression spring 6 urges the pressure piston 5 toward the left, thereby causing the sealing disc 7 to engage and bear against the connection piece seat 9 to thereby close off the feed conduit 10. The spring-biased piston 5 thereby serves as a supply valve for the feed conduit 10.

An irregularly-shaped distributor or regulating member 21 is disposed within the pressure chamber 12 and is fixed against both radial and axial displacement by suitable means, for example, an end cover or the like 15. The end cover 15 may be mounted, for example, by screwing it into the connection piece 8. A resilient circlet or seal ring 16 may be provided for sealing the joint between the end cover 15 and the connection piece 8. An axially oriented generally circular central channel 28 extends through the regulating member 21 to provide a communication between the feed conduit 10 and an outlet 19. The end cover 15 includes a threaded bore 20 which may be used, for example, to retain a connection nipple of a nozzle (not shown).

Circumferentially surrounding the regulating member 21, but without closing the central channel opening adjacent to the feed conduit 10, is a resilient elastomeric sleeve partition member 22, comprised preferably of rubber or any other suitable resilient elastomeric material. The sloping conical circumference 30 of the right exterior end of the regulating member 21 cooperates with the corresponding sloping conical interior surface 13 of the connection piece 8 to tightly clamp the right or inlet end of the sleeve 22 therebetween. By tightly clamping the inlet end of the sleeve 22 in this manner, the right end of the sleeve 22 also functions as a sealing means to prevent fluid flowing through the feed conduit 10 from entering the pressure chamber 12 on the exterior side of the sleeve 22. In a similar manner, an annular extension ring 23 on the circumference of the regulating member 21 cooperates with the right or interior surface 17 of the end cover 15 and with an interior shoulder 14 of the connection piece 8 to tightly clamp the left or outlet end of the sleeve 22 therebetween. By tightly clamping the outlet end of the sleeve 22 in this manner, the sleeve partition member 22 also functions as a sealing means to prevent fluid within the outlet 19 from entering the pressure chamber 12 on the exterior side of the sleeve 22.

As shown in FIG. 1, the regulating member 21 includes a plurality of axially-spaced grooves 24 which are semi-circular in cross-section and extend circumferentially around the member 21 in cooperation with the sleeve 22 to form vacuum channels. A plurality of connecting channels 25 extend radially outwardly from the central channel 28 to provide a communication between the central channel 28 and the vacuum channels 24. Thus, the resilient sleeve partition member 22 in effect divides the pressure chamber 12 into an outer subchamber (hereinafter referred to as the pressure chamber) and a plurality of inner subchambers formed by the vacuum channels 24.

A connecting channel 31 extends through the connection piece 8 to provide a constant communication between the pressure chamber 12 (on the exterior side of the sleeve 22) and the supply chamber 3. A return duct 32 also extends through the housing 1 to provide a communication between the supply chamber 3 and an intermediate chamber 39. A return line 41 extends from the intermediate chamber 39 to a return passage of a pump (not shown) in a manner similar to the pressure regulating channel 4.

A solenoid 37 including an armature 35 and appropriate electrical line 38 is attached to the housing 1 so that the armature 35 is aligned with the return duct 32. The solenoid 37 also includes a spring 36 which is under tension to urge the armature 35 upwardly away from the return duct 32 when the solenoid 37 is not energized. When the solenoid 37 is energized, a sealing disc 34 attached to the end of the armature 35 engages a seat 33 on the housing 1 to close off and seal the return duct 32 (see FIG. 2). The solenoid 37 and sealing disc 34 thus cooperate with the seat 33 to provide an electrically operated valve for controlling the pressure within the supply chamber 3. In the present instance, the electrically operated valve is normally open and is closed only when it is energized.

In the operation of the illustrated embodiment, FIG. 1 shows the valve in the at-rest or pre-blowing position whereby a fluid, for example, fuel oil, may flow from, for example, a pump (not shown) into the supply chamber 3 via the inlet channel 2. Since the feed conduit 10 is effectively blocked by the sealing disc 7, the incoming oil flows through the return duct 32, into the intermediate chamber 39 and out through the return line 41 to the return passage of the pump (not shown). During the at-rest period, a low over-pressure arises in the above-described flow path as well as in the pressure chamber 12 which communicates with the aforementioned flow path via the conneting channel 31. The over-pressure is not sufficient to overcome the bias of the piston spring 6 or to stretch the sleeve parition member 22 to force portions of the sleeve into the vacuum channels 24.

When the pre-blowing time is over, and the valve is to go into the working condition, current is directed over the electrical lines 38 to energize the solenoid 37. Upon the energizing of the solenoid 37, the armature 35 is displaced downwardly to the position shown in FIG. 2, with the sealing disc 34 engaging the seat 33 to effectively block the flow of oil from the return duct 32 into the intermediate chamber 39.

Figure 2:
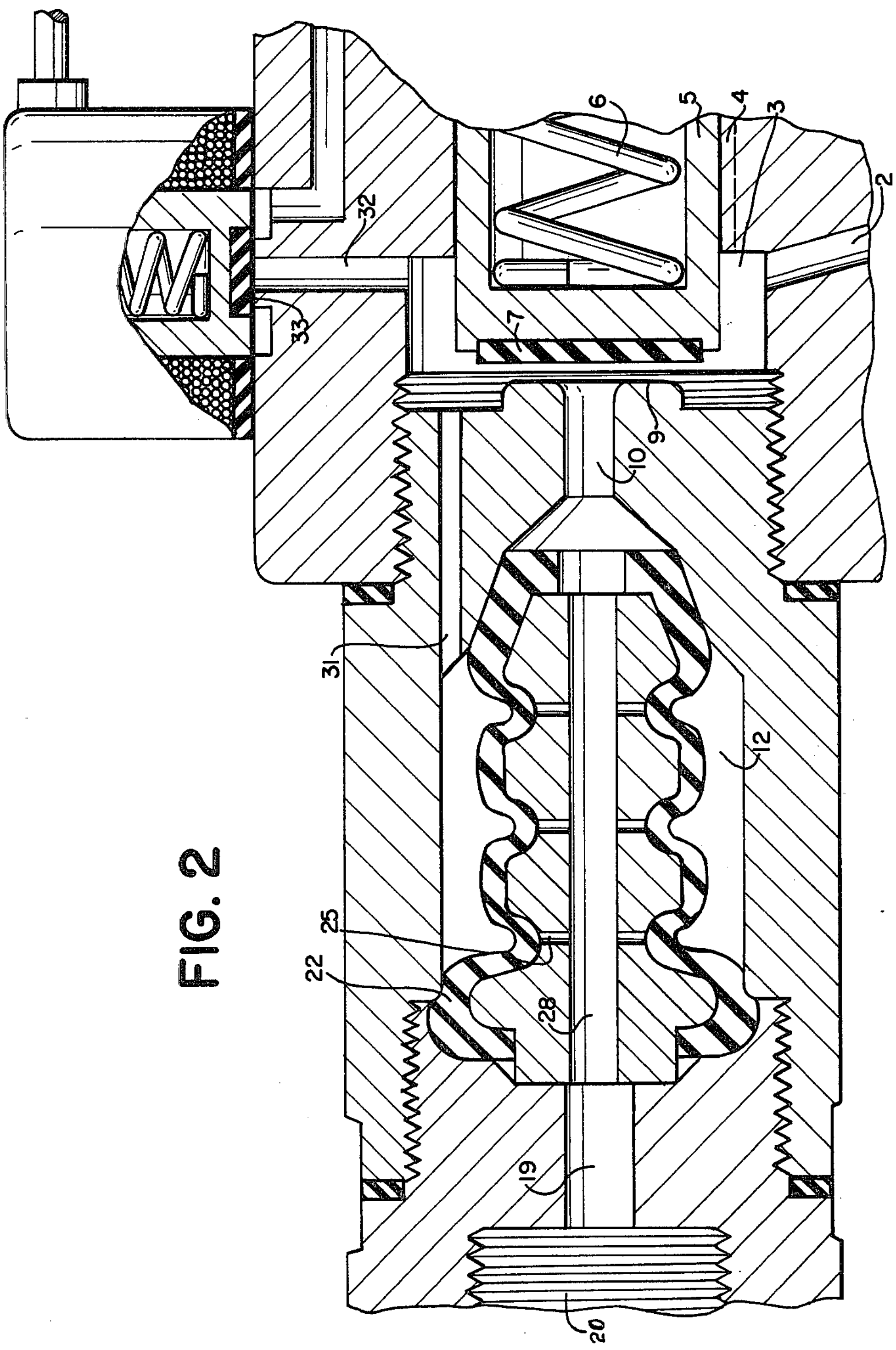
FIG. 2 is a similar sectional view of the apparatus of FIG. 1 in the working position.

When the return duct 32 is blocked, the pressure in the inlet 2 and supply chamber 3 as well as within connecting channel 31 and the pressure chamber 12 increases. Once the pressure within the pressure chamber 12 reaches a preset level, portions of the resilient sleeve 22 are pressed into the corresponding vacuum channels 24 (as shown in FIG. 2). The movement of the sleeve 22 into the vacuum channels 24 forces the air and any oil which may have accumulated within the vacuum channels 24 to be discharged through the connecting channels 25, the central channel 28 and out of the outlet 19 to the nozzle (not shown). This has the beneficial affect of providing a so-called "soft start" to the oil burner since the drops of oil which are first pressed out of the nozzle provide a very finely atomized air-oil spray which is quickly and easily ignited without any pulsations.

The pressure in the supply chamber 3 continues to increase until it exceeds the aforementioned preset piston pressure whereupon the pressure piston 5 is displaced to the right, moving the sealing disc 7 away from the seat 9 as shown in FIG. 2. Once the sealing disc 7 is removed from the seat 9, the oil flows from the supply chamber 3 through the feed conduit 10, the central channel 28 and out of the outlet 19 to the nozzle (not shown) for combustion. The pressure of the oil flowing through the valve is regulated by the pressure regulating channel 4 in a suitable manner which is known in the art. Since the area and the pressure on the outer side of the sleeve 22 (within pressure chamber 12) are large compared to that of the inner surface of the sleeve 22, connecting channel 25, and central channel 28, the sleeve 22 remains in the position as shown in FIG. 2 with portions thereof pressed into the corresponding vacuum channels 24. The valve now functions in a regular manner, without any additional restrictions or other impediments which may slow down or decrease the flow of oil to the nozzle during the combustion period.

When combustion is terminated and the flow of oil is to be interrupted, the solenoid 37 is de-energized and the armature 35 is displaced upwardly under the tension of the spring 36 to the rest position as shown in FIG. 1. Since the sealing disc 34 is removed from the seat 33, oil from the supply chamber 3 may now flow through the return duct 32, into the intermediate chamber 39 and out through the return line 41 to the return passage of th pump (not shown). As a result of the re-opening of the above-described at-rest return flow path, the pressure in the supply chamber 3 quickly decreases.

Once the pressure in the supply chamber 3 falls below the aforementioned preset piston pressure, the pressure piston 5 is displaced to the left under the urging of the piston spring 6 whereupon the sealing disc 7 engages the seat 9 (as shown in FIG. 1) to stop the flow of oil through the feed conduit 10. The pressure in the pressure chamber 12 correspondingly decreases, thereby allowing the sleeve 22 to revert to its original position as shown in FIG. 1. Because of the tightness of sleeve 22, as the sleeve portions are withdrawn from the corresponding vacuum channels 24 a series of partial vacuums are created which retract (back into the valve) and retain a small amount of oil (as well as some air) from the nozzle (not shown). In this manner, the so-called post-drip or post-spray of oil at the nozzle is effectively prevented. The quantity of oil which is retracted corresponds roughly to the quantity of oil which was previously discharged by the sleeve 22.

As described, the present invention effectively prevents the post-drip of oil without the need for increased pump pressure. There is no interference with the pump structure or the main flow line and if the oil retraction feature should fail due to the impurities in the oil or for any other reason, the valve would continue to function as a regular valve. By promptly preventing the post-drip flow of oil through the nozzle, all of the oil has time to completely burn, thereby resulting in less soot or carbonization build-up on the nozzle.

ALTERNATE EMBODIMENTS

Several variations of the above-described embodiment of the present invention are presented below. All of the alternate embodiments provide the same advantages as the above-described embodiment, but may be better suited for a particular purpose. In each of the below-described alternate embodiments and on the corresponding drawings, the same reference numerals that were used in conjunction with the above-described embodiment are again used, with the addition of alphabetic suffixes, to identify the same or similar components.

Figure 3:
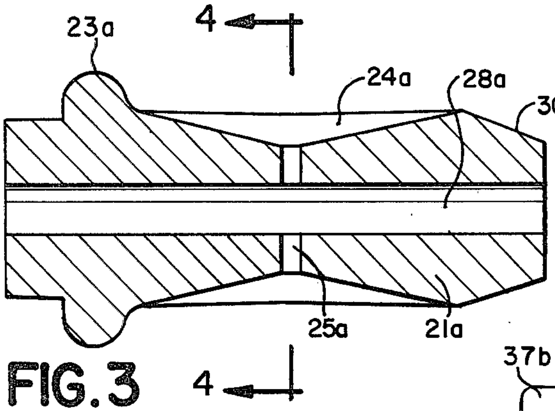
FIG. 3 is a sectional view of a portion of a first alternate embodiment of the present invention.
Figure 4:
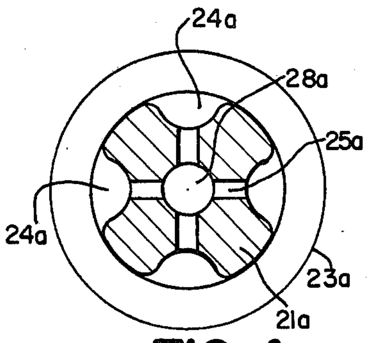
FIG. 4 is a sectional view of the apparatus of FIG. 3 taken along lines 4—4.

Referring now to FIGS. 3 and 4, there is depicted a portion of the first or "a" alternative embodiment of the present invention. The only differences between the above-described embodiment and the "a" embodiment lie in the shape of the regulating member 21*a*, the vacuum channels 24*a* and connecting channels 25*a*. Basically, the regulating member 21*a* includes a plurality of circumferentially-spaced axially-oriented grooves therein which form the vacuum chambers 24*a*. A corresponding plurality of circumferentially-spaced connecting channels 25*a* provide a communication between the central channel 28*a* and the vacuum channels 24*a*. The "a" embodiment operates in substantially the same manner as the above-described embodiment.

Figure 5:
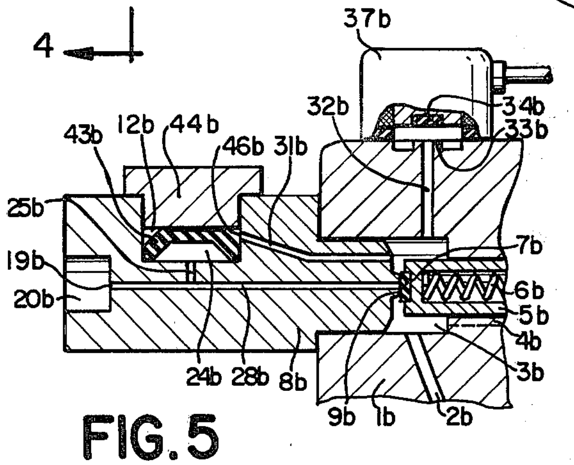
FIG. 5 is a sectional view of a second alternate embodiment of the present invention in the at-rest position.
Figure 6:
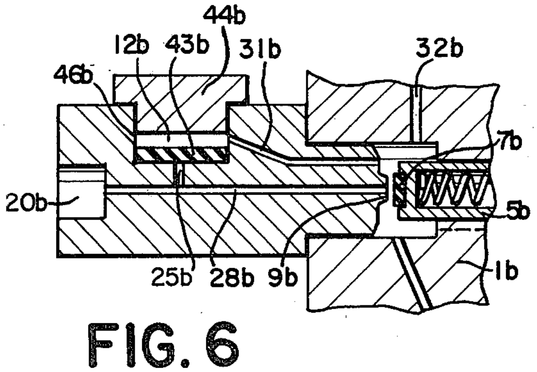
FIG. 6 is a similar sectional view of the apparatus of FIG. 5 in the working position.

Referring now to FIGS. 5 and 6, there is depicted the second or "b" alternative embodiment of the present invention. The structure and operation of the supply chamber 3*b*, pressure piston 5*b* (and related components including the sealing disc 7*b*, seat 9*b* and the piston spring 6*b* hereinafter collectively referred to as the pressure piston assembly) and the solenoid 37*b* (including related components sealing disc 34*b*, seat 33*b* hereinafter collectively referred to as the solenoid assembly) are exactly the same as that of the corresponding components of the embodiment of FIGS. 1 and 2 as described in detail above.

As shown in FIG. 5, a connection piece 8*b* is suitably attached to the housing 1*b*, for example, by means of a threaded portion on the connection piece 8*b* (not shown) which is screwed into a threaded bore (not shown) within the housing 1*b*. The connection piece 8*b* includes a generally circular central channel 28*b* extending axially therethrough to provide a communication between the supply chamber 3*b* and an oulet 19*b*. Located on one side of the connection piece 8*b* is a generally circular bore 46*b* which is enclosed by a cover or stopper member 44*b*. Positioned within the bore 46*b* is a resilient, elastomeric diaphragm partition member 43*b* generally frustum shaped, in the present embodiment frustoconical, (see FIG. 5) in its undeformed state. The interior of the diaphrgm partition member 43*b* is hollow to establish a vacuum chamber 24b. A connecting channel 25b provides a communication between the vacuum chamber 24b and the central channel 28b. The exterior of the diaphragm partition member 43b cooperates with the bore 46b and cover member 44b to establish an enclosed pressure chamber 12b. A connecting channel 31b extends through the connection piece 8b to provide a communication between the pressure chamber 12b and the supply chamber 3b.

In the operation of the "b" alternate embodiment, FIG. 5 shows the valve in the at-rest position whereby a fluid, for example, fuel oil may flow from a pump or other supply of pressurized oil (not shown) through the valve. In the at-rest position, the oil enters the inlet channel 2b and flows through the supply chamber 3b, return duct 32b and back through the return channel 41b via the solenoid assembly. Since the pressure within the supply chamber 3b is low, the preset bias of the piston spring 6b is not overcome and the pressure piston assembly is in the blocking position, as shown so that no oil flows into the central channel 28b. Likewise, the pressure in the pressure chamber 12b is not high enough to deflect the diaphragm member 43b, since the surface area of the diaphragm member 43b which is subjected to the pressure is small.

When the at-rest period is over, the solenoid 37b is energized, thereby blocking the return flow of oil out of the supply chamber 3 in the same manner as was described in detail above. The blocking of the return flow of oil causes the pressure within both the supply chamber 3b and the pressure chamber 12b to increase. When the increased pressure in the pressure chamber 12b reaches a predetermined level, the diaphragm member 43b deflects downwardly flat against the bottom of the bore 46b to the position as shown in FIG. 6. The deflection of the diaphragm member 43b forces any oil and air which may have accumulated within the vacuum channel 24b to be discharged (in the same manner as described above) through the connecting channel 25b, the central channel 28b and out of the outlet 19b to the nozzle (not shown).

The pressure within the supply chamber 3b continues to increase until it exceeds the preset piston pressure, whereupon the pressure piston 5b is displaced to the right in the manner as was discussed in greter detail above. Once the pressure piston 5b has been displaced to the right, oil from the supply chamber 3b flows freely through the central channel 28b and out of the outlet 19b to the nozzle (not shown). Since the area of the connecting channel 25b is small compared to the area of the pressure chamber 12b, the pressure on the outer side of the diaphragm member 43b is somewhat greater than the pressure on the side of the diaphragm member facing the central channel 28b and the diaphrgm member 43b remains in the position shown in FIG. 6. The valve now functions in a normal manner as was described in detail above without any restrictions or other impediments to retard the flow of oil to the nozzle.

When combustion is terminated and the flow of oil is to be interrupted, the solenoid 37b is de-energized, thereby re-opening the above-described return flow path and again allowing oil to flow from the supply chamber 3b through the return duct 32b and the solenoid assembly to the pump (not shown). The pressure in both the supply chamber 3b and the pressure chamber 12b then decreases. When the pressure in the supply chamber 3b falls below the preset piston pressure, the pressure piston 5b is displaced to the left to the position as shown in FIG. 5 thereby blocking the flow of oil through the central channel 28b. The decrease in the pressure in the pressure chamber 12b results in the diaphragm member 43b being deflected upwardly to its original position as shown in FIG. 5. Because of the tightness of the diaphragm member 43b within the bore 46b, when the diaphragm member 43b deflects upwardly, a partial vacuum is created to retract and retain therein a small amount of oil from the central channel 28b and thus from the nozzle.

Figure 7:
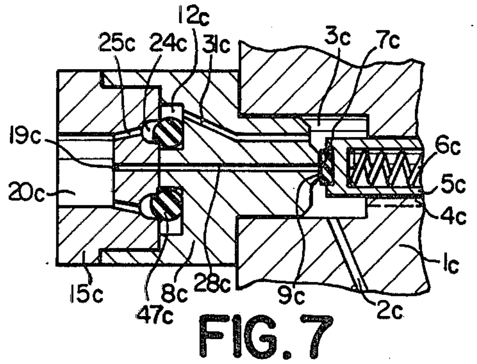
FIG. 7 is a sectional view of a third alternate embodiment of the present invention in the at-rest position.
Figure 8:
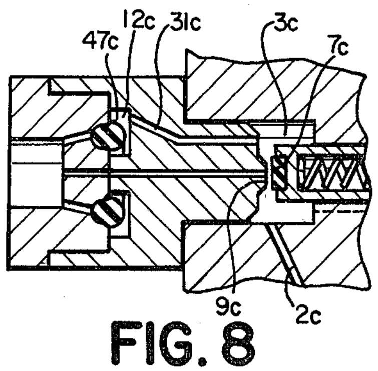
FIG. 8 is a similar sectional view of the apparatus of FIG. 7 in the working position.

FIGS. 7 and 8 depict a third or "c" alternate embodiment of the present invention which may be utilized in applications in which pre-blowing is not needed or desired. Again, the structure and operation of the supply chamber 3c, and pressure piston assembly of FIGS. 7 and 8 are essentially the same as that of the corresponding above-described components of the embodiment of FIGS. 1 and 2. For the sake of brevity, a detailed explanation of the structure and operation of these components will not be repeated in conjunction with the following description of the "c" embodiment of the present invention.

Referring now to FIG. 7, the connecting piece 8c includes an annular pressure chamber 12c which is aligned with an annular vacuum channel or groove 24c in the end cover 15c. Two or more connecting channels 25c communicate between the vacuum channel 24c and the output bore 20c. A connecting channel 31c communicates between the pressure chamber 12c and the supply chamber 3c. A resilient O-ring partition member 47c comprised of a suitable volumetrically deformable elastomeric material is disposed within the pressure chamber 12c.

The operation of the present "c" embodiment is completely hydraulically controlled by the pump without any preblowing. When the pump motor is not running, the valve is in the initial or no-flow position as shown in FIG. 7. When the pump is turned on, fuel oil flows into the valve and the pressure in both the supply chamber 3c and the pressure chamber 12c rapidly increases. When the pressure in the pressure chamber 12c reaches a predetermined level, a portion of the O-ring partition member 47c is pressed into the vacuum chamber 24c (see FIG. 8), thereby forcing any oil which may have accumulated therein to be discharged through the connecting channels 25c and output bore 20c and into the nozzle (not shown). The O-ring 47c forms a tight seal so that no oil flows directly from the pressure chamber 12c into vacuum channel 24c.

The pressure in the supply chamber 3c continues to increase until the pump reaches the preset working pressure. At the preset working pressure the pressure piston 5c is displaced to the right, thereby moving the sealing disc 7c away from the seat 9c (see FIG. 8) and oil flows through the central channel 28c to the nozzle (not shown). As with the previously described embodiments, the O-ring partition member 47c remains in place within the vacuum channel 24c as shown in FIG. 8 due to the fact that the pressure in the pressure chamber 12c is somewhat larger than the pressure in the outlet bore 20c and as the area of member 47c exposed to pressure chamber 12c is larger than its area exposed to the outlet bore 20c.

When the flow of oil is to be interrupted, the pump motor is turned off, thereby quickly decreasing the pressure in the supply chamber 3c and the pressure chamber 12c. As the pressure decreases, the O-ring 47c begins to revert to its initial position (see FIG. 7) within the pressure chamber 12c, thereby withdrawing a small quantity of oil to equalize the pressure. Combustion may continue for an additional short period of time. As the pressure in the supply chamber 3c falls below the preset level, the pressure piston 5c is displaced to the left, causing the sealing disc 7c to again engage the seat 9c to block the flow of oil through the central channel 28c (see FIG. 7). Due to the decreased pressure in the pressure chamber 12c, the O-ring partition member 47c fully reverts back to its initial position within the pressure chamber 12c. Because of the tightness of the seal by the O-ring 47c, a partial vacuum is created to retract and retain a small amount of oil from the nozzle (not shown).

Figure 9:
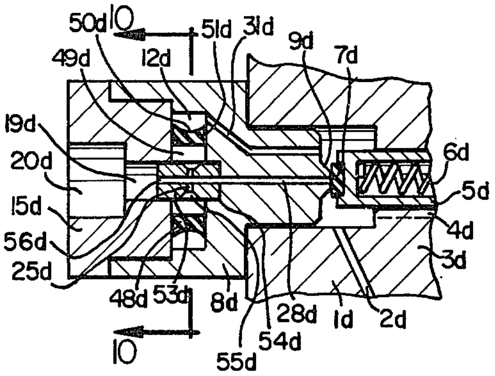
FIG. 9 is a sectional view of a fourth alternate embodiment of the present invention in the at-rest position.
Figure 10:
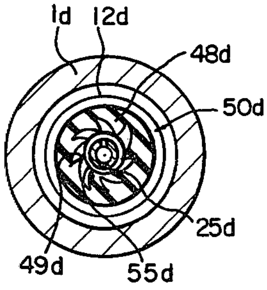
FIG. 10 is a sectional view of the apparatus of FIG. 9 taken along lines 10—10.
Figure 11:
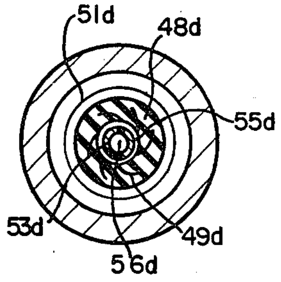
FIG. 11 is a similar sectional view of the apparatus of FIG. 10 in the working position.

FIGS. 9-11 depict a fourth or "d" alternate embodiment of the present invention which, like the above-described "c" embodiment, may be utilized for applications in which pre-blowing is not needed or desired. Again the structure and operation of the supply chamber 3d as well as the pressure piston assembly are the same as the corresponding above-described components of FIGS. 1 and 2 and will not be discussed in detail with respect to the following description of the "d" embodiment of the present invention.

Referring to FIG. 9, the connection piece 8d includes a circular bore 51d at the axial end thereof. The end cover 15d cooperates with the bore 51d to form an axially oriented circular chamber. A cylindrical distributing member 53d is disposed within the axial center of the circular chamber and is retained within a recess 54d in the connection piece 8d. The distributing member 53d includes a central channel 56d which extends axially therethrough and is aligned with the central channel 28d.

Surrounding and engaging the distributing member 53d is an annular resilient collar partition member 48d which is constructed of a suitable elastomeric material. For purposes which will hereinafter become apparent, the exterior surface 50d of the collar 48d is concave and cooperates with the bore 51d and the end cover 15d to establish a pressure chamber 12d. The interior of the collar 48d includes a plurality of cavities 49d which have a crescent-shaped axial cross section (see FIG. 10). The crescent-shaped cavities 49d which are open at their inner sides function as the vacuum channels in the present "d" embodiment. A pair of connecting channels 25d extend radially outwardly from the central channel 56d to an annular channel 55d in the exterior surface of the distributing member 53d. The openings in the crescent-shaped cavities 49d are axially aligned with the annular channel 55d.

The operation of valve of the present "d" embodiment, like the above-described "c" embodiment, is completely controlled by the pump (not shown). When the pump is turned on, fuel oil flows into the valve and the pressure in both the supply chamber 3d and the pressure chamber 12d rapidly increases. When the pressure in the pressure chamber 12d reaches a predetermined level, the annular collar-partition member 48d collapses radially inwardly (see FIG. 11), thereby forcing any oil which may have accumulated within the crescent-shaped cavities 49d to be discharged through the annular channel 55d, connecting channels 25d, central channel 56d and output bore 20d and into the nozzle (not shown). The annular collar 48d forms a tight seal with the walls of the connection piece 8d and the end cover 15d so that no oil flows from the pressure chamber 12d into the annular channel 55d.

As with the above-described "c" embodiment, the pressure in the supply chamber 3d continues to rise until the piston assembly is displaced away from the connecting piece 8d so that oil flows through the central channel 28d and 56d to the nozzle (not shown). Because of the large surface area of the concave exterior surface 50d, the annular collar 48d remains in its collapsed state as shown in FIG. 11 due to the fact that the pressure in the pressure chamber 12d is somewhat greater than the pressure in the central channel 56d.

When the flow of oil is to be interrupted, the pump motor is turned off, thereby quickly decreasing the pressure in both the supply chamber 3d and the pressure chamber 12d. As the pressure decreases, the annular collar partition member 48d begins to revert to its initial position (see FIGS. 9 and 10) thereby drawing back and retaining a small quantity of oil within the crescent-shaped cavities 49d. As the pressure in the supply chamber 3d falls below the preset level, the pressure piston 5d is displaced back to its initial position (FIG. 9) thereby blocking the flow of oil into the central channel 28d. The decreased pressure in the pressure chamber 12d allows the annular collar 48d to fully revert to its initial position. Because of the tightness of the collar 48d, a partial vacuum is created to retract and retain within the reformed crescent-shaped cavities 49d a small amount of oil from the nozzle.

Figure 12:
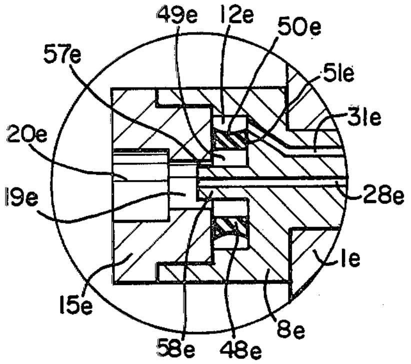
FIG. 12 is a sectional view of a portion of a fifth alternate embodiment of the present invention.

FIG. 12 depicts a portion of a fifth or "e" alternate embodiment of the present invention which is a simplified version of the above-described "d" embodiment. In the "e" embodiment, a resilient collar-partition member 48e has a circular bore 51e and is donut shaped, leaving a portion 58e of the connection piece 8e to cooperate with the end cover 15e and serve as a distribution member. An annular connecting channel 57e is formed between the connection piece 8e and the end cover 15e to provide a communication conduit between the crescent-shaped collar cavities 49e and the outlet 19e. The operation of the "e" embodiment, which is the same as the operation of the "d" embodiment, is evident.

Figure 13:
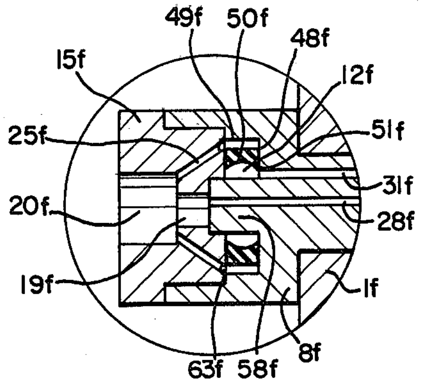
FIG. 13 is a sectional view of a portion of a sixth alternate embodiment of the present invention.

FIG. 13 depicts a portion of a sixth or "f" alternate embodiment of the present invention which is another simplified version of the above-described "d" embodiment. In the "f" embodiment, the resilient collar-partition 48f is donut-shaped and has a circular bore 51f, leaving a portion 58f of the connection piece 8f to cooperate with the end cover 15f as a distribution member. The annular collar-partition member 48f is different in that the interior surface 50f is concave and the exterior portion includes the crescent-shaped cavities 49f. The pressure chamber 12f is inwardly of the annular collar 48f and an annular channel 63f and connecting channels 25f in the end cover 15f provide a communication between the crescent-shaped cavities 49f and the output bore 20f. A complete description of the operation of the "f" embodiment need not be presented since it is substantially the same as that of the above-described "d" embodiment.

Figure 14:
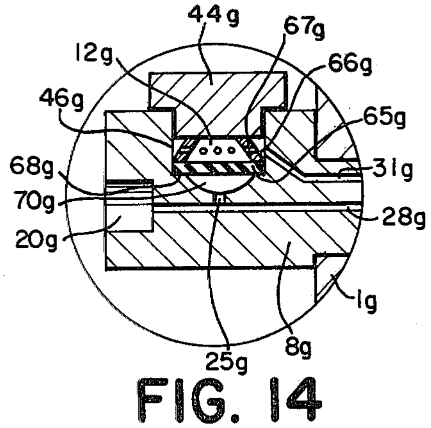
FIG. 14 is a sectional view of a portion of a seventh alternate embodiment of the present invention.

FIG. 14 depicts a portion of a seventh or "g" alternate embodiment of the present invention which is a simplified version of the above-described "c" or "d" embodiments. In the "g" embodiment, the connection piece 8g includes a circular bore 46g in the top thereof. The radial interior of the bore 46g includes a semi-spherical vacuum chamber 70g which communicates with the central channel 28g by way of a connecting channel 25g.

Positioned within the circular bore 46g is a circular resilient or elastic diaphragm partition member 65g the bottom edge of which engages a circular shoulder 68g on the connection piece 8g. A plug or stopper member 44g is tightly installed within and cooperates with the circular bore 46g and the diaphragm partition member 65g to establish a pressure chamber 12g. A frustoconical support member 66g abuts both the radial exterior of the diaphragm partition member 65g and the interior of the stopper member 44g to hold the diaphragm partition member 65g in place and to thereby tightly seal the vacuum chamber 70g. A plurality of holes 67g are bored into the frustoconical support member 66g to allow for complete circulation of oil throughout the pressure chamber 12g.

The operation of the "g" embodiment is substantially the same as that of the above-described "c" or "d" embodiments except that when the pressure in the pressure chamber exceeds a predetermined value a portion of the diaphragm member 65g is forced into the vacuum chamber 70g. A detailed explanation of the rest of the operation of the "g" embodiment is not needed for a complete understanding of this embodiment.

Figure 15:
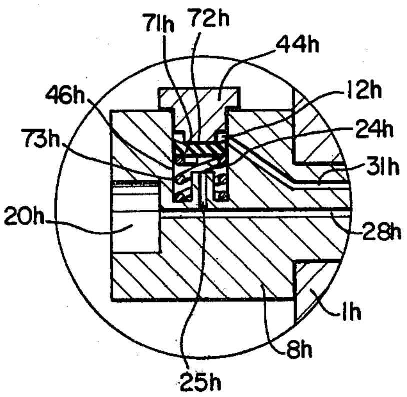
FIG. 15 is a sectional view of a portion of an eighth alternate embodiment of the present invention.

FIG. 15 depicts a portion of an eighth or "h" alternative embodiment of the present invention which is similar to the above-described "g" embodiment. In the "h" embodiment, the connection piece 8h includes a circular bore 46h in the top side thereof. The radial interior of the bore 46h communicates with the central channel 28h by means of a connecting channel 25h.

Disposed for displacement within the bore 46h is a pressure piston partition member 71h. The outer surface of the pressure piston partition member 71h cooperates with a bore 46h and a stopper member 44h to establish a pressure chamber 12h. The inner surface of the pressure piston partition member 71h cooperates with the bore 46h to establish a vacuum channel 24h.

In the rest position, a coil spring 73h resiliently urges the pressure piston partition member 71h outwardly to engage a seat 72h on the stopper member 44h. As with the supply chamber pressure piston assembly (see FIG. 1) the pressure piston partition member 71h is displaced radially inwardly from the seat 72h when the pressure in the pressure chamber 12h reaches a value which is determined by the compression of the spring 73h.

The operation of the "h" embodiment of the present invention is substantially the same as that of the above described embodiments except that the displacement of the pressure piston partition member 71h functions as the resilient elastomeric member to create the oil-withdrawing vacuum. Therefore, a complete discussion of the operation is not believed to be necessary.

Figure 16:
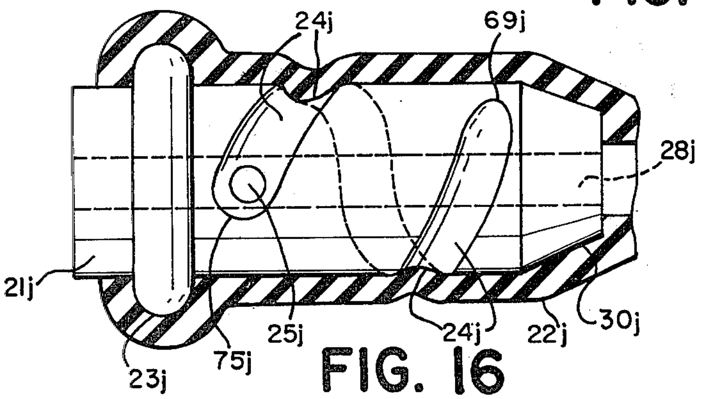
FIG. 16 is a sectional view of a portion of a ninth alternate embodiment of the present invention.

FIG. 16 depicts a portion of a ninth or "j" alternate embodiment of the present invention. The "j" embodiment is substantially the same as the above-discussed embodiment of FIGS. 1 and 2 except that in the "j" embodiment the distributing member 21j is substituted for the distributing member 21. The member 21j has a vacuum channel 24j which comprises a channel having a semicircular cross section which is continuously spiralled around the radial exterior of the regulating or distributing member 21j from a first axial location 69j to a second axial location 75j. A connecting channel 25j provides communication between the vacuum channel 24j and the central channel 28j at one end of the vacuum channel. The depth of the spiral groove forming the channel 24j increases from a shallow depth at one end 69j to a greater depth at the other end 75j. From the rest position, the elastomeric sleeve partition 22j first bottoms into the groove at 69j and then finally bottoms against the connecting channel 25j at the deep end 75j of the channel 24j. At shut-off, the sleeve partition is first displaced from the deepest part of the groove in the reverse order. In other respects, the "j" embodiment operates substantially the same as the above-discussed embodiment of FIGS. 1 and 2 and will not now be described in detail.

In this embodiment, the sleeve partition member 22j is subjected to both axial and radial displacement within a limited part of the resilient sleeve 22j. If fatigue should occur in the sleeve 22j after a long period of use, it can be rotated a half revolution on the member 21j, at which point the unstressed section of 22j can give a doubled product life to the apparatus.

In all of the embodiments described above, the apparatus provides the following characteristics.

It is completely insensitive to accumulation of air bubbles in the outer pressure chamber, so that the physical orientation of the apparatus is completely optional. Furthermore, the inner vacuum chamber is completely free from air after one single work cycle, so that there is no venting problem. The suck-back occurs quickly, e.g., 4/100 second when the apparatus is controlled by a solenoid, and combustion stops up to 5 times quicker than a conventional unit, since the operation which gives the suck-back can begin to function before the oil pump's own shut-off valve closes completely. The final suck-back phase draws a smaller quantity of air through the nozzle, and during the following period of standstill, such air is partially expelled while the oil in the nozzle holder expands because of the heat from the combustion space. Because of the quick close-off which is attained, all oil has time to burn while the air pressure from the blower still is high, resulting in less soot build-up in the furnace. When combined with the "soft start" described above, no soot or carbonization occurs on the nozzle, ignition electrodes or burner head, avoiding a source of approximately 90% of all service calls. Therefore, the invention decreases the total need for service of, e.g., an oil burner with regard to the most usual faults as well as contributes to giving the unit a better total performance as required.

The apparatus can be produced at reasonable cost since the apparatus does not require precision parts.

The apparatus has been found to function dependably. The normal impurities in the oil which have passed through the filter of the pump do not disturb the oil flows. If impurities should cause failure in the operation of the resilient partition, preventing its function, the oil pump functions in a completely normal way (however, without suck-back) until the next service opportunity. In other words, the apparatus does not intrinsically create any problems.

The apparatus does not require higher pump capacity but instead allows the pump to be maximally utilized, i.e, the apparatus is not dependent on over-capacity on the part of the pump in order to maintain a power reserve for suck-back.

All of the embodiments or "combinations of these" can be controlled either by solenoid or completely hydraulically, which considerably simplifies installation in existing units.

From the foregoing description of the ten disclosed embodiments it can be seen that the present invention provides a fluid valve which is effective to limit post-drip of fluid after the valve is closed without the need for an additional source of pressure higher than that of the working presence. It will be recognized by those skilled in the art that changes may be made to the above-described embodiments of the invention without departing from the broad inventive concept thereof. It is understood, therefore, that this invention is not limited to the particular embodiments disclosed, but it is intended to cover all modifications which are within the scope and spirit of the invention as defined by the appended claims.

I claim:

1. A non-drip valve apparatus for regulating a fluid flow from an inlet to an outlet, comprising:

a housing having an inlet, a supply chamber, a vacuum chamber and an outlet, the supply chamber being in fluid communication with the inlet and separate from said vacuum chamber;

a first conduit extending between the supply chamber and the outlet to provide primary flow therethrough;

supply valve means at the supply chamber end of said first conduit, said valve means being selectively operable to respectively open and close said first conduit;

said vacuum chamber having a hollow wall and a regulating member therein having an exposed surface, said wall and surface defining a predetermined volume in said chamber, an elastomeric sleeve surrounding said surface and constituting a displaceable partition member therein, said member partitioning said vacuum chamber into at least two separate subchambers and operable upon displacement of said partition to expand the volume one of said subchambers and reduce the volume of the other of said subchambers, and vice versa;

a second conduit extending between said outlet and a first of said subchambers to provide a suck-back passage; and a third conduit extending between said supply chamber and a second of said subchambers on the opposite side of said member from said first subchamber to provide fluid pressure communication therebetween, whereby said displaceable partition member operates in response to changes in the pressure differential between the inlet and outlet to reduce and expand the volume of said first subchamber in response to the fluid pressure in said second subchamber being respectively above and below the pressure level in said first subchamber, said regulating member having at least one groove extending along said surface, said elastomeric sleeve member operable to be displaced into said groove by pressure fluid surrounding said sleeve.

2. The valve apparatus as recited in claim 1 wherein said regulating member extends between the supply chamber and the outlet, said regulating member groove extending circumferentially around the surface thereof, said second conduit communicating with said groove and said resilient elastomeric sleeve member circumferentially surrounding said regulating member and operable to be displaced into said groove by pressure fluid in said second subchamber.

3. The valve apparatus as recited in claim 1 wherein said regulating member disposed within the vacuum chamber extends between the supply chamber and the outlet, said groove extending spirally along the surface thereon to constitute said first subchamber, said resilient elastomeric sleeve member circumferentially surrounding said regulating member and operable to be displaced into said groove by pressure fluid in said second subchamber.

4. The valve apparatus as recited in claim 3 wherein the spiral groove is shallow at a first axial end and increases to a greater depth at its other axial end.

5. The valve apparatus as recited in claim 3 wherein said communication between the groove and the second conduit is at said other end of the groove where it has the greater depth.

6. The valve apparatus as recited in claim 1 wherein said supply valve means is pressure activated and operates in response to the fluid pressure in said supply chamber being above and below a predetermined pressure level.

7. The valve apparatus as recited in claim 6 including means to control the pressure in said supply chamber.

* * * * *

UNITED STATES PATENT AND TRADEMARK OFFICE

CERTIFICATE OF CORRECTION

PATENT NO. : 4,354,519

DATED : October 19, 1982

INVENTOR(S) : Curt A. Bjorklund

It is certified that error appears in the above-identified patent and that said Letters Patent are hereby corrected as shown below:

Column 7, line 45, "greter" should read --greater--.

Column 13, line 2, delete "presence" and insert --pressure--.

Claim 5, line 1, delete "3" and insert --4--.

Signed and Sealed this

*Eleventh* Day of *January 1983*

[SEAL]

*Attest:*

GERALD J. MOSSINGHOFF

*Attesting Officer* *Commissioner of Patents and Trademarks*